United States Patent
Yamamoto (10) Patent No.: US 7,034,872 B1
(45) Date of Patent: Apr. 25, 2006

(54) IMAGE PROCESSING APPARATUS AND METHOD

(75) Inventor: Takeshi Yamamoto, Miyagi (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/537,669

(22) Filed: Mar. 29, 2000

(30) Foreign Application Priority Data

Mar. 30, 1999 (JP) .................. 11-089364

(51) Int. Cl.
*H04N 9/64* (2006.01)

(52) U.S. Cl. .................... 348/246; 348/247

(58) Field of Classification Search .......... 348/246, 348/247, 241, 243, 245; 382/266, 268, 269, 382/275; 386/47, 49
See application file for complete search history.

(56) References Cited

U.S. PATENT DOCUMENTS

| | | | | |
|---|---|---|---|---|
| 4,237,488 A | * | 12/1980 | Takemura | 348/616 |
| 4,600,946 A | * | 7/1986 | Levine | 348/616 |
| 4,654,714 A | * | 3/1987 | Hurst et al. | 348/247 |
| 4,805,023 A | * | 2/1989 | Younse et al. | 348/247 |
| 5,047,863 A | * | 9/1991 | Pape et al. | 348/247 |
| 5,796,430 A | * | 8/1998 | Katoh et al. | 348/246 |
| 5,805,216 A | * | 9/1998 | Tabei et al. | 348/246 |
| 6,611,288 B1 | * | 8/2003 | Fossum et al. | 348/246 |
| 6,618,084 B1 | * | 9/2003 | Rambaldi et al. | 348/247 |

* cited by examiner

*Primary Examiner*—David Ometz
*Assistant Examiner*—Yogesh Aggarwal
(74) *Attorney, Agent, or Firm*—Arent Fox PLLc

(57) ABSTRACT

An image processing apparatus includes: a memory having a first field for storing image data and a second field for storing defective pixel position data; a counter for counting the number of pixels of image data sequentially transferred from an image sensor one line after another; a defect correction circuit for correcting the image data of each pixel sequentially transferred from the image sensor in accordance with image data of pixels adjacent to a pixel whose image data is currently transferred; and a controller for writing the corrected image data in the memory if the count becomes coincident with the position data of the defective pixel, and writing the image data not corrected and directly supplied from the image sensor in the memory, if the count is not coincident with the position data of the defective pixel. An image processing apparatus and method is provided which is capable of correcting defective pixel data at high speed with a simple circuit.

17 Claims, 6 Drawing Sheets

IMAGE PROCESSING APPARATUS AND METHOD

This application is based on Japanese Patent Application HEI 11-089364, filed on Mar. 30, 1999, the entire contents of which are incorporated herein by reference.

BACKGROUND OF THE INVENTION a) Field of the Invention

The present invention relates to techniques of processing image data output from an image sensor, and more particularly to an image processing apparatus and method which can compensate for defects of pixels of an image sensor through digital data processing.

b) Description of the Related Art

Figure 5:
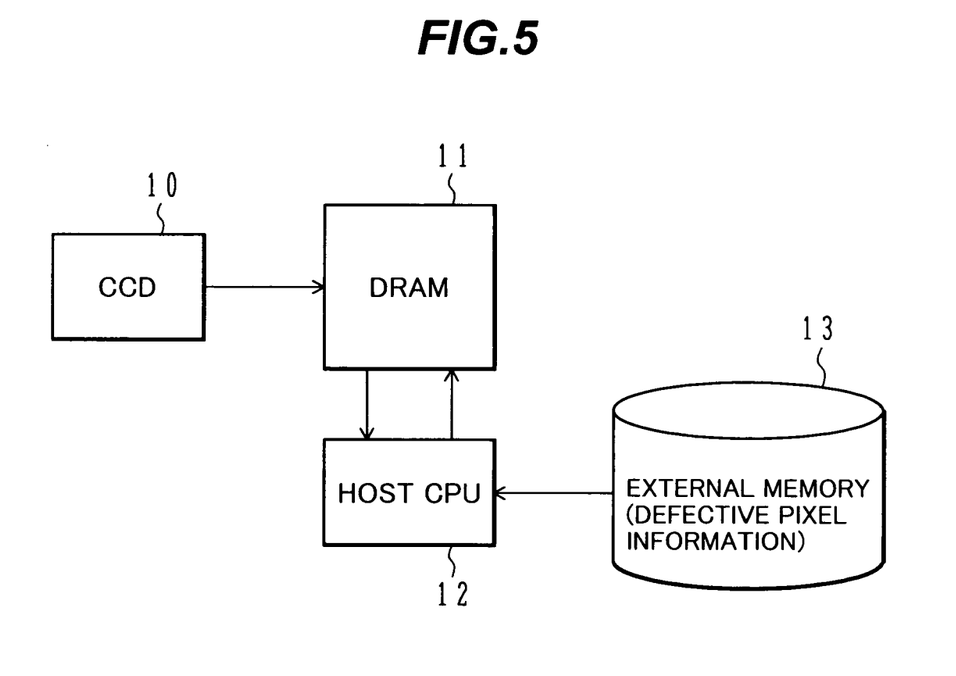
FIG. 5 is a block diagram of a conventional image processing apparatus.

FIG. 5 shows the structure of a general image processing apparatus. An image processing apparatus may be a digital camera. Image data output from an image sensor (CCD) 10 is sequentially written in a DRAM 11, for example, one line after another. Pixel data of all lines, i.e., image data of one frame, is temporarily written in DRAM 11.

The image data of one frame once written in DRAM 11 is read under the control of a host CPU 12 to write it in another storage medium, to output it to a display device, or to further process it and output the result.

An image sensor 10 manufactured in a semiconductor factory has defective pixels with some percentage. Even if there are some defective pixels among several hundred thousand pixels or several million pixels of each product, such defects are permitted as commercial products. Since pixel defects lower the image quality, it is preferable to correct the defects by some means. For example, data of defective pixels are corrected by digital processing techniques or the like.

The positions of defective pixels of an image sensor can be known at the stage of manufacture inspection. The position information of defective pixels is supplied from a manufacturer of image sensors, and stored in an external memory 13. The position information of defective pixels is supplied from the external memory 13 to the host CPU 12 which executes a process of correcting data of defective pixels of the image sensor in the following manner.

Image data of one frame supplied from the image sensor 10 is once written in DRAM 11 together with image data of defective pixels. Next, the position information of defective pixels of the first one line is fetched from the external memory 13 to correct the data of the defective pixels designated by the defective pixel position information. This defective data correction process is performed for all lines containing defective pixels.

Figure 4A:
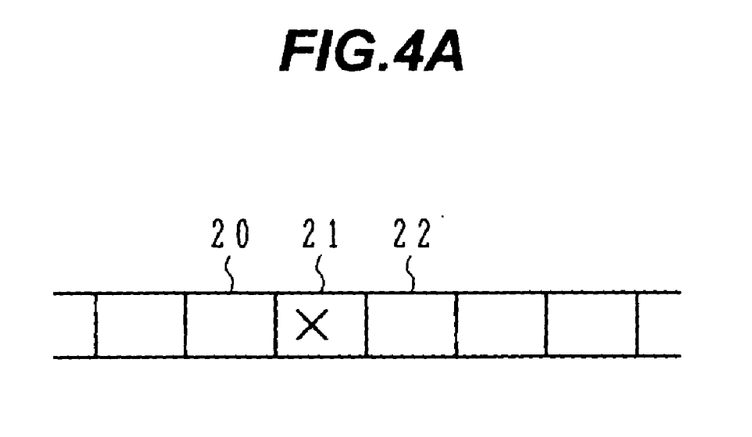
FIGS. 4A and 4B are diagrams showing the layout of pixels illustrating how data of defective pixels is corrected.

Referring to FIGS. 4(A) and 4(B), a process of correcting defective pixel data will be detailed. FIG. 4(A) is a schematic diagram showing a layout of some pixels in one line of a monochrome image sensor. A pixel 21 indicated by a cross mark is a defective pixel. In accordance with the defective pixel position information, the host CPU 12 reads the data of normal pixels 20 and 22 one pixel before and after the defective pixel 21, from DRAM 11. An average of the data of the pixels 20 and 22 is calculated. The data at an address of the defective pixel 21 in DRAM 11 is replaced by the calculated average data. This data correction process is executed for all lines containing defective pixels, and the data of defective pixels in DRAM 11 is corrected.

Figure 4B:
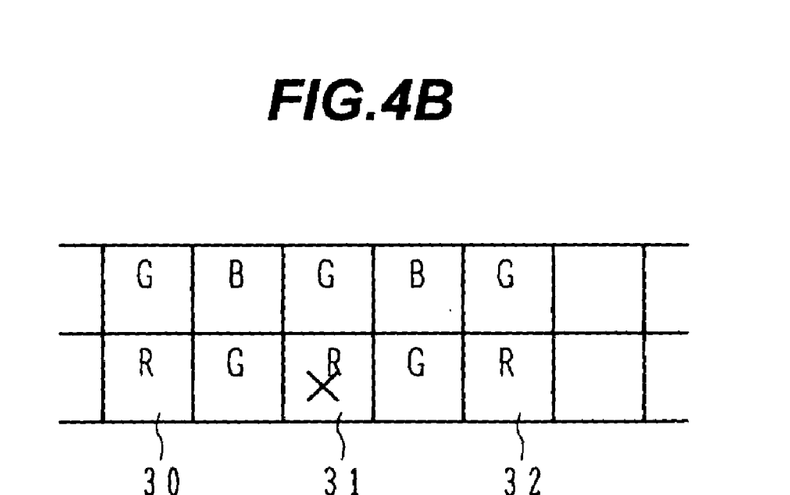

FIG. 4B is a schematic diagram showing a layout of some pixels in two lines of a color image sensor. This pixel layout is called a Bayer matrix. In the Bayer matrix, a row alternately disposing an R (red) pixel and a G (green) pixel and a row alternately disposing a B (blue) pixel and a G (green) pixel are alternately disposed in the column direction.

It is assumed that an R pixel 31 indicated by a cross mark is a defective pixel in a subject line n. In accordance with the defective pixel position information, the host CPU 12 reads the data of normal R pixels (same color as the defective pixel) forward and backward nearest to the defective pixel 31, from DRAM 11. An average of the data of the two normal pixels 30 and 32 is calculated. The data in DRAM 11 at an address of the defective R pixel 31 is replaced by the calculated average data. Defective data for the B and G pixels is corrected by the similar process. This data correction process is executed for all lines containing defective pixels, and the data of defective pixels in DRAM 11 is corrected.

Image data of one frame subjected to the defect data correction is read from DRAM 11 to follow a next process of reading the image data in another storage, to output it to a display device, or to further process it and output the result.

The image processing apparatus described above executes the defect pixel data correction process after image data of one frame from the image sensor is once written in DRAM 11. The operation of reading data of normal pixels near the defective pixel from DRAM 11, executing the defective pixel data correction process, and overwriting image data in DRAM 11 takes a process time of about 10 clocks.

Since the defective pixel data correction process is repeated as many as the number of defective pixels, it takes a fairly long to calculate the correction data for all defective pixels and write it in DRAM. This results in a long time taken to correct image data of one frame picked up with an image sensor with defective pixels and output corrected image data. There is therefore a long wait time for a picked up image to be displayed. Since the time necessary for the defective pixel data correction is long, this correction is not applied to a monitor moving image having a frame rate of 30 frames per sec.

SUMMARY OF THE INVENTION

It is an object of the present invention to provide an image processing apparatus and method capable of correcting data of defective pixels at high speed and with a simple circuit structure.

According to one aspect of the present invention, there is provided an image processing apparatus for processing image data supplied from an image sensor, comprising: a memory having a first field for storing image data of one frame and a second field for storing position data of a defective pixel of the image sensor; control means for controlling image data to write into the memory and image data to read from the memory; a counter for counting the number of pixels of image data sequentially transferred from the image sensor; and a defect correction circuit for correcting the image data of each pixel sequentially transferred from the image sensor in accordance with image data of pixels adjacent to a pixel whose image data is currently transferred, wherein the control means writes the image data corrected by the defect correction circuit in the first field of the memory at a storage location corresponding to the defect pixel, if a count of the counter becomes coincident with a number corresponding to the position data of the defective pixel in the second field of the memory, and writes the image data supplied directly from the image sensor in the first field, if the count is not coincident with the number corresponding to the position data of the defective pixel.

According to another aspect of the invention, there is provided an image processing method of processing image data supplied from an image sensor, comprising the steps of: (a) reading defective pixel position data of one line of the image sensor from a memory; (b) sequentially fetching the image data from the image sensor; (c) counting the number of pixels of the image data fetched from the image sensor; (d) correcting the image data sequentially transferred from the image sensor in accordance with image data of pixels adjacent to a pixel whose image data is currently transferred; and (e) writing the corrected image data in the memory at a storage location corresponding to the defective pixel, if a count becomes coincident with a number corresponding to the position data of the defective pixel, and writing the image data not corrected and supplied directly from the image sensor in the memory, if the count is not coincident with the number corresponding to the position data of the defective pixel.

Each time image data is fetched from the image sensor, the data correction process for a defective pixel is executed, and image data of a normal pixel or correction data of a defective pixel is written in the memory. Accordingly, image processing can be performed at high speed.

As above, image processing substantially in real time is possible. An image picked up with an image sensor having defective pixels can be corrected and reproduced at high speed. A moving image can also be reproduced substantially in real time. Image data of a defective pixel can be corrected with a simple circuit.

BRIEF DESCRIPTION OF THE DRAWINGS

FIGS. 3A and 3B are block diagrams showing the structure of a defect correction circuit of the image processing apparatus of the invention.

DETAILED DESCRIPTION OF THE PREFERRED EMBODIMENTS

Figure 1A:
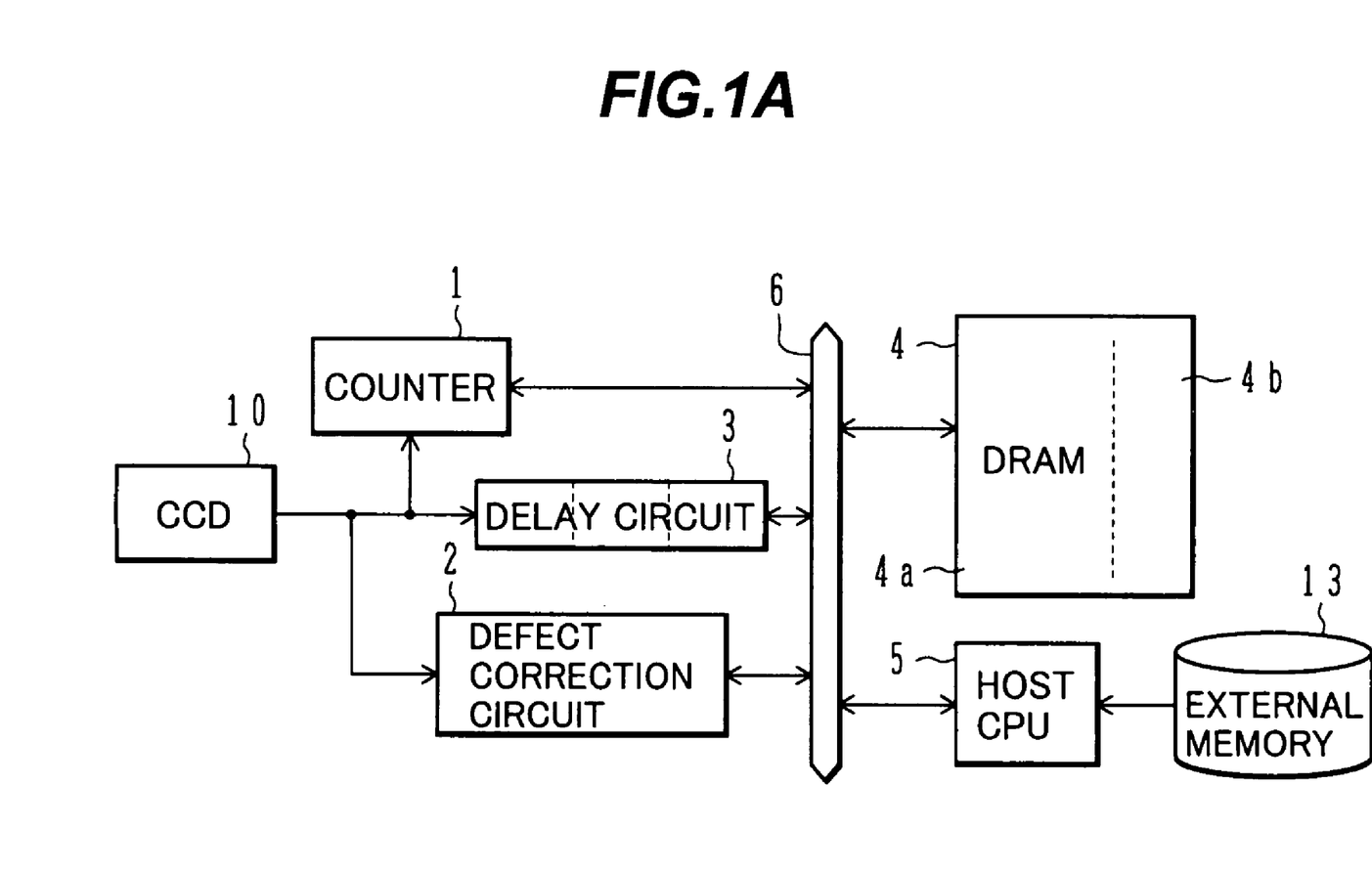
FIGS. 1A, 1B and 1C are a block diagram of an image processing apparatus and diagrams illustrating the operation thereof, according to an embodiment of the invention.
Figure 1B:
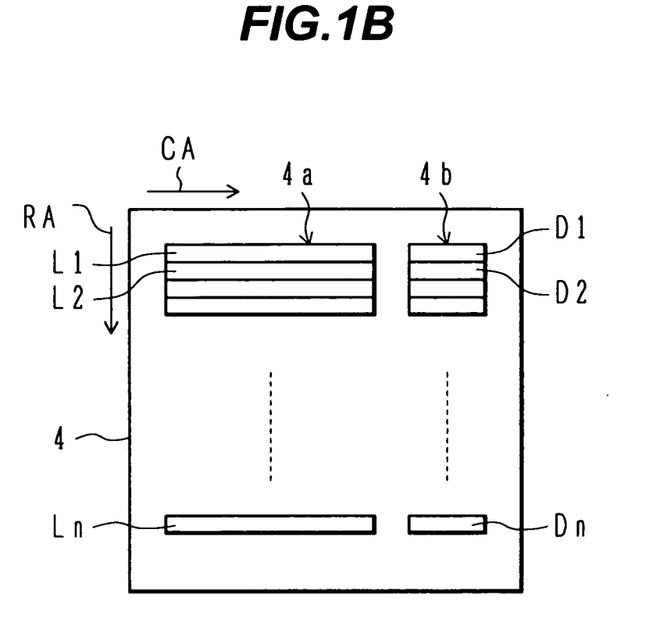
Figure 1C:
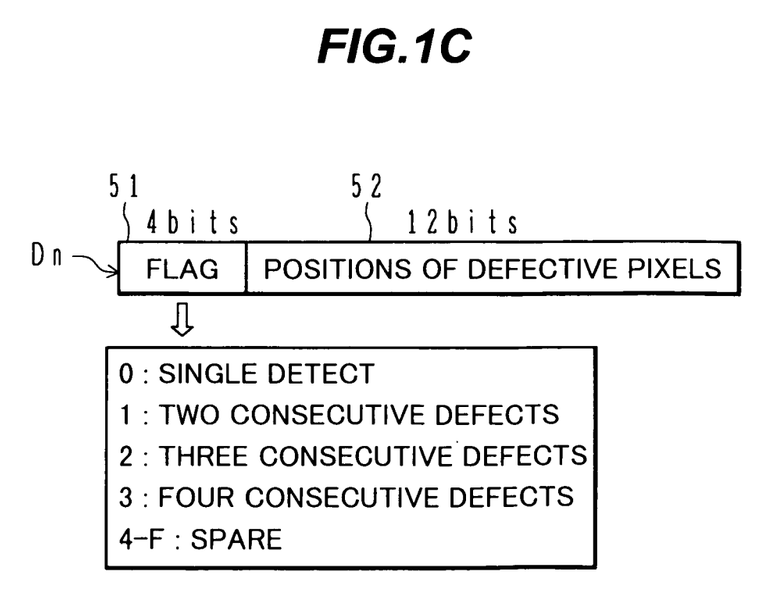
Figure 2:
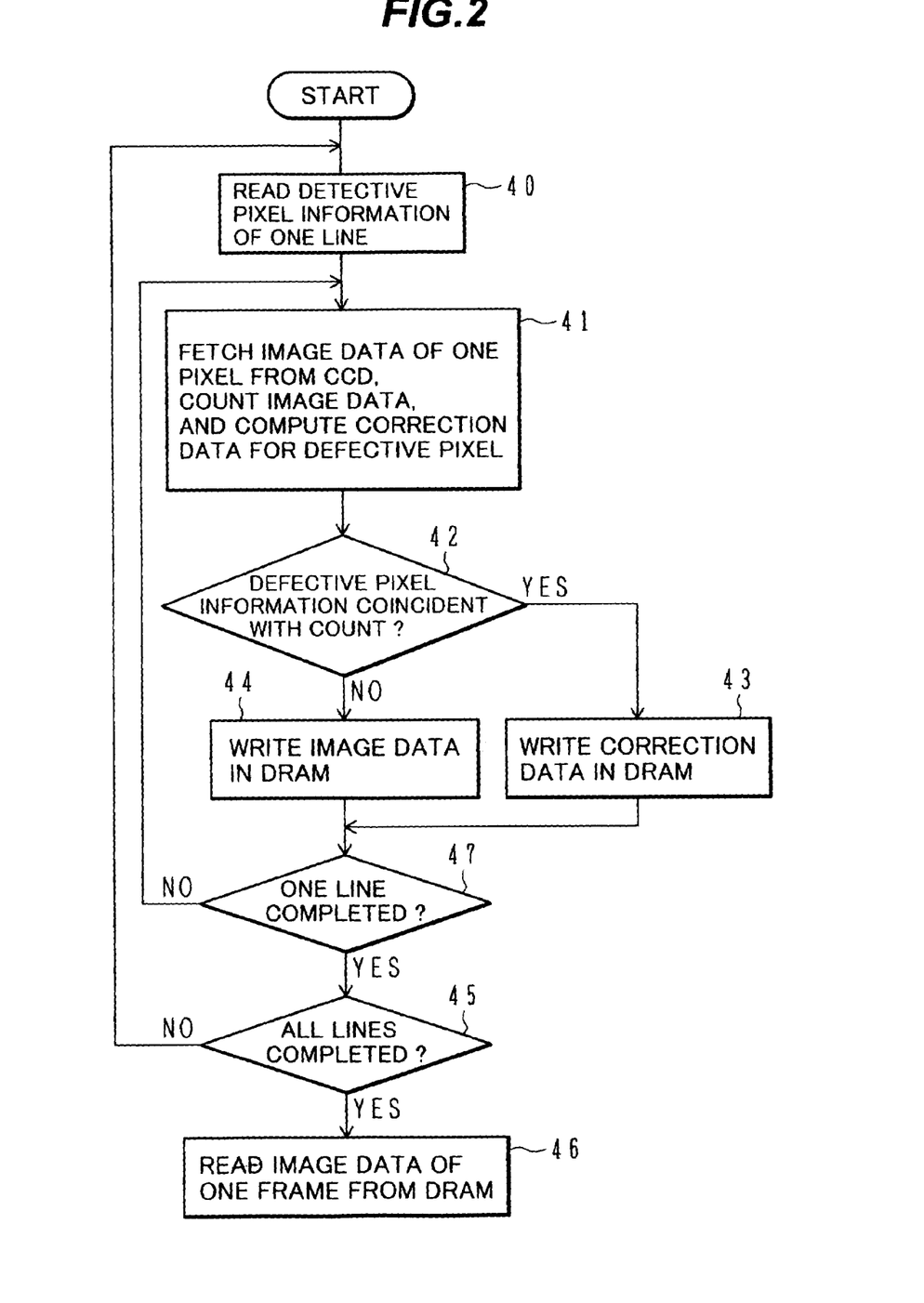
FIG. 2 is a flow chart illustrating the operation of the image processing method according to an embodiment of the invention.

FIGS. 1A, 1B and 1C are a block diagram of an image processing apparatus and diagrams illustrating the operation thereof, according to an embodiment of the invention. FIG. 2 is a flow chart illustrating the operation of the image processing method to be executed by the apparatus shown in FIGS. 1A to 1C, the method including a defective pixel data correction process. With reference to the accompanying drawings, the operation of the embodiment apparatus will be described. Referring to FIG. 1A, reference numeral 1 represents a counter for counting the number of pixels of image data of one frame to be transferred from an image sensor (CCD) 10. The image data is serially transferred from the image sensor at a clock signal of, for example, 12.27 MHz. Reference numeral 2 represents a correction circuit for defective pixel data. Reference numeral 3 represents an image data delay circuit. Reference numeral 4 represents a DRAM for storing image data and defective pixel information of at least one frame. Reference numeral 5 represents a host CPU for controlling these circuits. Reference numeral 6 represents a bus line. Reference numeral 13 represents an external memory for storing the defective pixel information of the image sensor 10. The defective pixel information is supplied from a manufacturer of the image sensor.

The memory field of DRAM 4 includes an image data field 4a for storing image data of one frame and a defective pixel field 4b for storing detective pixel information. The pixel defect information of the image sensor 10 in the external memory 13 is supplied to and stored in the defect information field 4b.

The memory field of DRAM 4 is schematically shown in FIG. 1B. An address in DRAM 4 is identified by a row address RA and a column address CA. In the image data field 4a, image data of each line of the image sensor 10 is stored in each field L1 to Ln (n is the line number) at a corresponding row address RA, and defective pixel information of each line is also stored in each field D1 to Dn at a corresponding row address. For example, pixel data of the first line is stored in the field L1 at the first row address, and the defective pixel information of the first line is stored in the field D1 at the first row address.

FIG. 1C shows the format of the defective pixel information field Dn. If a flag 51 of upper 4 bits is 0, it means that there is a single defective pixel at the n-th line. If the flag is 1, it means that there are two consecutive defective pixels. If the flag is 2, it means that there are three consecutive defective pixels. If the flag is 3, it means that there are four consecutive defective pixels. A defective pixel position information field 52 of lower 12 bits indicates the position of a single defective pixel on the line, and indicates the position of the first detective pixel if there are consecutive defective pixels.

For example, DRAM 4 can store data of 16 bits at one address, and each field Dn has four sets of the defective pixel information of 16 bits shown in FIG. 1C. These numbers are only illustrative and the embodiment is not intended to be limited to those numbers. If there is no defective pixel in line, the position information field 52 is set with 1 for all lower 12 bits.

With the memory format of this embodiment, if the image size of the image sensor corresponds to, for example, VGA (640 horizontal pixels×480 lines), the defective position information can show the positions of maximum 7680 defective pixels (=4 consecutive defect×4 sets×480 lines), and the data of these defective pixels can be corrected.

The image processing process of this embodiment will be described with reference to FIG. 2 and when necessary to FIGS. 1A to 1C. First, prior to fetching the image data of the first line from the image sensor 10, the defective pixel data of the first line is read from the defective pixel information field 4b (FIG. 1B) of DRAM 4. The read information is supplied to the counter 1 (FIG. 1A) at Step 40. For example, a number corresponding to the position of a defective pixel is input to the counter 1, and each time data of a pixel is supplied, the count is decremented so that when the count becomes 0, the supplied data is the data of the defective pixel.

Next, at Step 41 the operation of fetching image data from the image sensor 10 starts. During this data fetch, the counter 1 counts the number of pixels of the fetched data. In parallel to the image data fetch, the defect correction circuit 2 generates (calculates) correction data for all of the pixels irrespective of whether or not there is a defective pixel. The correction data generation (calculation) is performed by a method similar to that described with reference to FIGS. 4A and 4B. In this embodiment, however, the correction data generation (calculation) is performed by the defect correction circuit 2, whereas the conventional apparatus shown in FIG. 5, it is performed by the host CPU 12.

Figure 3A:
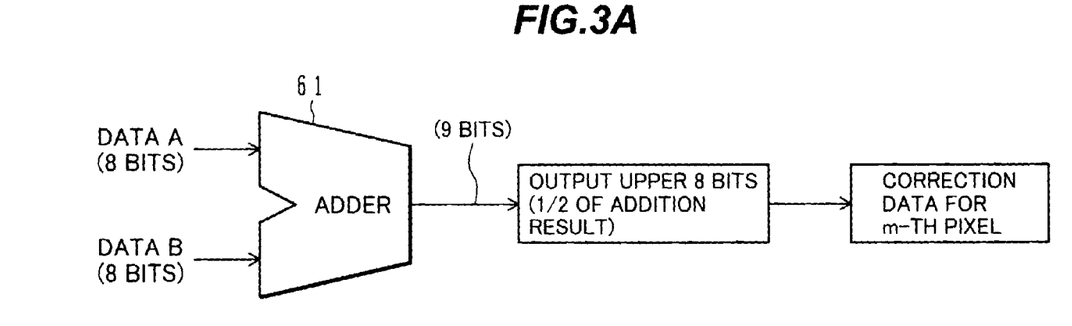
FIG. 3A shows the structure of the circuit performing a correction process using adjacent pixels in the row direction.

FIG. 3A shows an example of the defect correction circuit 2 for monochrome image data. In order to generate the correction data for each pixel, data A and data B adjacent to the subject pixel are input to an adder 61 and added together. The lowest bit of the addition result A+B is cut off so that ((A+B)/2) or an average of A and B can be obtained. A more specific example will be described.

First, the case wherein the correction data is generated by using data of adjacent pixels in the row direction will be described. It is assumed that the correction data for the m-th (m is an optional positive integer) pixel of the first line is generated. Pixel data (8 bits) X(m−1) at (m−1)-th pixel and pixel data (8 bits) X(m+1) at (m+1)-th pixel are input from the image sensor to the adder 61 to calculate a sum [X(m−1)+X(m+1)]. Of the 9-bit output from the adder 61, the upper 8 bits are selected. Namely, the sum is divided by 2, i.e., [X(m−1)+X(m+1)]/2, by cutting off the lowest one bit. The value of the upper 8 bits is an average of the input data of two pixels, and is used as the correction data. The defect correction is fundamentally the same for color image data. The correction data may be generated by another known method instead of the above-described method.

Next, it is checked at Step 42 whether the count becomes coincident with the value corresponding to the defect pixel position information in the defect pixel information field 4b. If coincident, at Step 43 the correction data generated at Step 41 is written in the data field 4a of DRAM 4 at the address of the defective pixel position. If not coincident at Step 42, the image data supplied from the image sensor 10 and delayed by a delay circuit 3 by a proper time, e.g., one row, in response to an instruction from the host CPU 5 issued in accordance with the defect position information, is written in the data field 4a of DRAM 4.

Next, it is checked at Step 47 whether the process is completed for all pixel data in the line. If not, the flow returns to Step 41 to repeat the above process for the next pixel data. If the process is completed for all pixel data in the line, the flow advances to Step 45.

It is checked at Step 45 whether data of all lines is written. If not, the flow returns to Step 40 to repeat the above process for the next line. The above process is repeated until image data of all lines of one frame is written in DRAM 4.

After all the image data including correction data is written in DRAM 4, the image data is read from DRAM 4 at Step 46. If necessary, another image processing is executed and then the image data is supplied to the display device.

Moving image data is received from the image sensor at a clock of, for example, 12.27 MHz. Moving image data is supplied to the display device at a clock of, for example, 12.27 MHz. With the embodiment method, moving image data received from the image sensor 10 can be corrected and displayed on the display device in real time of 30 frames/sec.

If the data read time of DRAM 4 is considerably faster than the data transfer rate, data may be read and output each time the data write at Step 43 or Step 44 is completed.

If the pixel at the end of one line is a defective pixel, the correction data can be generated by using the data of the pixel adjacent to the subject pixel. If there are consecutive defective pixels in one line, the correction data can be generated through vertical interpolation. If an L row contains consecutive defective pixels, the correction data is generated by using the data of corresponding m-th pixels at (L−1) and (L+1) rows. In this case, the delay circuit gives a delay time corresponding to three rows to the image data supplied from CCD 10 in response to an instruction the host CPU 5 issued in accordance with the defect pixel information in DRAM 4. The correction data may be generated through weighted mean in accordance with distances from the defective pixel.

Figure 3B:
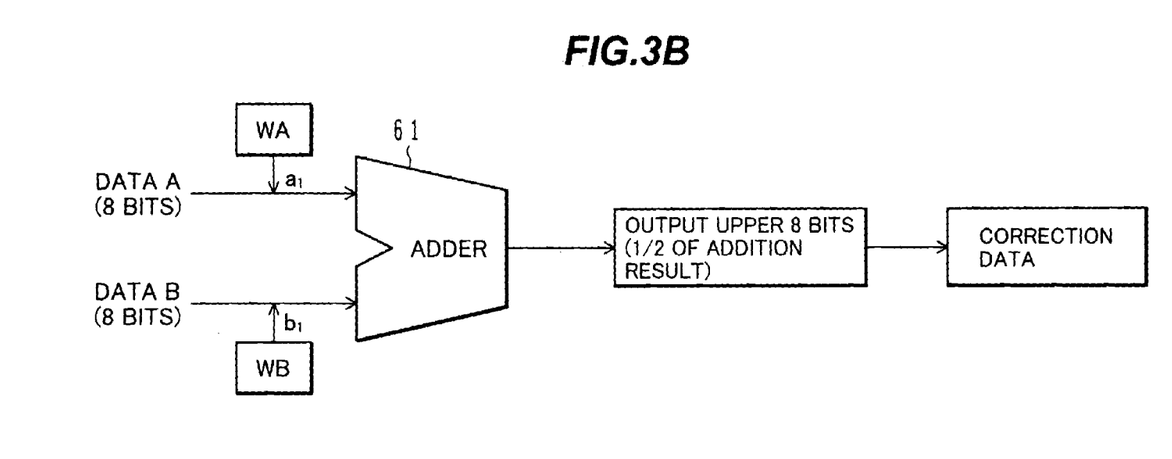
FIG. 3B shows the structure of the circuit performing a correction process using adjacent pixels in the column direction.

FIG. 3B shows an example of the defect correction circuit capable of calculating weighted mean. In generating the correction data of a defective pixel, data A and data B of adjacent pixels are input to an adder 61. In this case, for example, a distance from the defective pixel is taken into consideration. It is assumed that the distance of the pixel of data A is $a_1$ from the defective pixel, and the distance of the pixel of data B is $b_1$ from the defective pixel. The data input to the adder 61 is weighted to, for example, $cA/1_1$ and $cB/b_1$. The data is added by the adder and bit-shifted to output weighted mean of $(cA/a_1+cB/b_1)/2=c(Ab_1+Ba_1)/2a_1b_1$.

In this embodiment, the memory is provided with the field for storing defective pixel information, each time pixel data is fetched from the image sensor, the data correction process is executed, and image data or correction data is selected in accordance with the defective pixel information and written in the memory. Image processing substantially in real time is possible for each line. An image picked up with an image sensor having defective pixels can be corrected and reproduced at high speed. A moving image can also reproduced substantially in real time. Image data of a defective pixel can be corrected with a simple circuit including the counter and defect correction circuit.

The present invention has been described in connection with the preferred embodiments. The invention is not limited only to the above embodiments. It is apparent that various modifications, improvements, combinations, and the like can be made by those skilled in the art.

What is claimed is:

1. An image processing apparatus for processing image data supplied from an image sensor, comprising:
   a delay circuit having a first input for receiving image data sequentially supplied from the image sensor, a first function circuit for delaying the received image data by a time required for defect correction process, and a first output for supplying each of the delayed image data;
   a memory having a first field for storing image data of one frame and a second field for storing position data of a defective pixel of the image sensor;
   a counter for counting the number of pixels of image data sequentially transferred from the image sensor; and
   a defect correction circuit having a second input for receiving the image data supplied from the image sensor, a second function circuit for forming corrected image data for each pixel from the image sensor based on image data of pixels adjacent to a pixel of interest, and a second output for supplying each of the corrected image data; and
   control means for writing the image data supplied from the second output of said defect correction circuit in the first field of said memory at a storage location corresponding to the defect pixel, if a count of said counter becomes coincident with a number corresponding to the position data of the defective pixel in the second field of said memory, and writing the image data supplied from the first output of the delay circuit in the first field, if the count is not coincident with the number corresponding to the position data of the defective pixel.

2. An image processing apparatus according to claim 1, wherein a storage location in said memory is identified by a row address and a column address, the first field stores the image data of each line at a corresponding row address, and the second field stores the position data of the defective pixel at the same row address.

3. An image processing apparatus according to claim 2, wherein the second field of said memory stores information representative of a single defective pixel or the number of consecutive defective pixels and information representative of a position of the defective pixel in each line.

4. An image processing apparatus according to claim 1, wherein said defect correction circuit circulates an average of image data of pixels adjacent to a subject pixel.

5. An image processing apparatus according to claim 1, further comprising an external memory, which store position data of defective pixel of the image sensor.

6. An image processing apparatus according to claim 1, wherein said memory is a dynamic random access memory.

7. An image pickup apparatus including a display device for displaying an image signal processed by the image processing apparatus according to claim 1.

8. An image pickup apparatus according to claim 7, wherein the display device is a liquid crystal display.

9. An image processing method of processing image data supplied from an image sensor, comprising the steps of:
  (a) reading defective pixel position data of the image sensor from a memory;
  (b) sequentially fetching the image data from the image sensor, giving a delay, and supplying the delayed image data as an output;
  (c) counting the number of pixels of the image data fetched from the image sensor;
  (d) forming corrected image data for each pixel from the image sensor based on image data of pixels adjacent to a pixel of interest and supplying the corrected image data as an output; and
  (e) selecting one of the outputs of steps (b) and (d), and writing the corrected image data in the memory at a storage location corresponding to the defective pixel, if a count becomes coincident with a number corresponding to the position data of the defective pixel, and writing the delayed image data not corrected in the memory, if the count is not coincident with the number corresponding to the position data of the defective pixel.

10. An image processing method according to claim 9, wherein a storage address in the memory is identified by a row address and a column address, the memory stores the position data of the defective pixel in each line at a row address corresponding to the line, and said step (e) writes the image data not corrected or the corrected image data in each line in the memory at a row address corresponding to the line and at a corresponding column address.

11. An image processing method according to claim 9, wherein said step (d) calculates an average of image data of pixels adjacent to a pixel of interest.

12. An image processing method according to claim 9, wherein said step (d) calculates an average of image data of pixels adjacent to a subject pixel in a row direction.

13. An image processing method according to claim 9, wherein said step (d) calculates an average of image data of pixels adjacent to a subject pixel in a column direction.

14. An image processing method according to claim 9, wherein said step (d) performs a weighing process in accordance with distances between pixels adjacent to a pixel of interest and the pixel of interest.

15. An image processing method according to claim 11, wherein the calculation process is a process of dividing a sum of pixel data of two pixels adjacent to a pixel of interest and cutting a lowest one bit.

16. An image processing apparatus for processing image data supplied from an image sensor, comprising:
  a delay circuit having a first input for receiving image data sequentially supplied from the image sensor, a first function circuit for delaying the received image data by a time required for defect correction process, and a first output for supplying each of the delayed image data;
  a memory having a first field for storing image data of one frame and a second field for storing position data of a defective pixel of the image sensor;
  a counter for counting the number of pixels of image data sequentially transferred from the image sensor; and
  a defect correction circuit having a second input for receiving the image data supplied from the image sensor, a second function circuit for forming corrected image data for each pixel based on image data of pixels adjacent to a pixel of interest, and a second output for supplying each of the corrected image data; and
  control means for writing the image data supplied from the second output of said defect correction circuit in the first field of said memory at a storage location corresponding to the defect pixel, if a count of said counter becomes coincident with a number corresponding to the position data of the defective pixel in the second field of said memory, and writing the image data supplied from the first output of the delay circuit in the first field, if the count is not coincident with the number corresponding to the position data of the defective pixel,
  wherein the delay circuit and the defect correction circuit process and output the image data in parallel.

17. An image processing method of processing image data supplied from an image sensor, comprising the steps of:
  (a) reading defective pixel position data of the image sensor from a memory;
  (b) sequentially fetching the image data from the image sensor, giving a delay, and supplying the delayed image data as an output;
  (c) counting the number of pixels of the image data fetched from the image sensor;
  (d) forming corrected image data for each pixel based on image data of pixels adjacent to a pixel of interest and supplying the corrected image data as an output; and
  (e) selecting one of the outputs of steps (b) and (d), and writing the corrected image data in the memory at a storage location corresponding to the defective pixel, if a count becomes coincident with a number corresponding to the position data of the defective pixel, and writing the delayed image data not corrected in the memory, if the count is not coincident with the number corresponding to the position data of the defective pixel,
  wherein the delay circuit and the defect correction circuit process and output the image data in parallel.

* * * * *